United States Patent [19]

Piazzola

[11] Patent Number: 4,573,897
[45] Date of Patent: Mar. 4, 1986

[54] SYSTEM FOR HOT EXTRUDING, DRAWING, AND SIMILARLY PROCESSING PLASTOMERS OR ELASTOMERS, INCORPORATING A MEANS OF RECOVERING AND UTILIZING HEATED AIR FROM THE COOLING OF HEATED PARTS

[76] Inventor: Gaetano Piazzola, Via Borri, 148, 21100 Varese, Italy

[21] Appl. No.: 588,653

[22] Filed: Mar. 12, 1984

[30] Foreign Application Priority Data

Mar. 17, 1983 [IT] Italy ............................. 20132 A/83

[51] Int. Cl.⁴ ............................................. B29B 13/02
[52] U.S. Cl. ................................ 425/143; 264/176 R; 425/378 R; 425/547; 425/550; 425/551
[58] Field of Search ............. 264/176 R, 38; 425/203, 425/143, 378 R, 547, 550, 551, 526

[56] References Cited

FOREIGN PATENT DOCUMENTS 0144141 11/1981 Japan ............................. 264/176 R Primary Examiner—Jay H. Woo
Assistant Examiner—Timothy W. Heitbrink
Attorney, Agent, or Firm—Bucknam and Archer

[57] ABSTRACT

A system is disclosed for extruding, drawing, vacuum molding or processing, or the like hot processing of plastomers or elastomers, which can conveniently utilize the hot air from the cooling process of its heated component parts. The system makes use, to heat the extruder cylinder, of ventilated electric thermal units wherein ventilation is performed in closed circuit fashion. In particular, arrangements are made to convey the hot air from the cited electric thermal units, through specially provided ducting, to areas of the system where application of heat is required.

1 Claim, 3 Drawing Figures

SYSTEM FOR HOT EXTRUDING, DRAWING, AND SIMILARLY PROCESSING PLASTOMERS OR ELASTOMERS, INCORPORATING A MEANS OF RECOVERING AND UTILIZING HEATED AIR FROM THE COOLING OF HEATED PARTS

BACKGROUND OF THE INVENTION

This invention relates to a system for hot extruding, molding, drawing, and similarly processing plastomers or elastomers, incorporating a means of recovering and utilizing heated air from the cooling of parts which undergo or are subjected to heating.

As is known, some machinery for processing plastomeric or elastomeric materials require both the application of heat, for properly softening the material, and a supply of cold air (or other fluid) to promote maintenance of an optimum temperature in the heated parts.

This is a typical requirements of extruder and drawing machine cylinders, wherein heating is accomplished by means of electric thermal units having coaxial interspaces, wherethrough ventilating air is blown as required to prevent the cylinder temperature from exceeding preset values.

Said ventilating air, of course, is exhausted from the electric thermal units to carry away a given amount of heat which, with conventional systems, is usually discharged to the atmosphere.

On the other hand, it is also known that some components of such systems require to be heated or preheated. This heat is applied, according to current practice, by employing separated heat sources, which results in a not negligible increase of operating cost.

SUMMARY OF THE INVENTION

It is a primary object of this invention to eliminate such prior expenditure by providing a system for hot extruding, drawing, or otherwise hot processing plastomers or elastomers, which can utilize the hot air exhausted by the ventilation of electric thermal units to deliver it where various temperatures may be required for various uses.

A further object of this invention is to provide a system for hot extruding, drawing, molding, or similarly processing plastomers or elastomers, which can bring about a considerable decrease in processing costs.

It is another object of the invention to provide a system for hot extruding, drawing, molding, or otherwise processing plastomers or elastomers, which can promote maintenance of a constant cylinder temperature in extruding, drawing, and molding machines, while preventing it from undergoing sharp thermal surges.

These and other objects, such as will be apparent hereinafter, are achieved by a system for hot extruding, molding, drawing, and similarly processing plastomers or elastomers, according to the invention, utilizing for cylinder heating, closed circuit ventilated electric thermal units, characterized in that it comprises a set of pipes adapted to deliver hot air from said electric thermal units to areas of said system requiring heat application.

BRIEF DESCRIPTION OF THE DRAWINGS

Further features and advantages of the system for extruding, drawing, or otherwise hot processing plastomers or elastomers, according to this invention, will be better understood by making reference to the following detailed description of a preferred embodiment of a plastic film blow-working system, in conjunction with the accompanying illustrative drawing, where.

DESCRIPTION OF A PREFERRED EMBODIMENT

Figure 1:
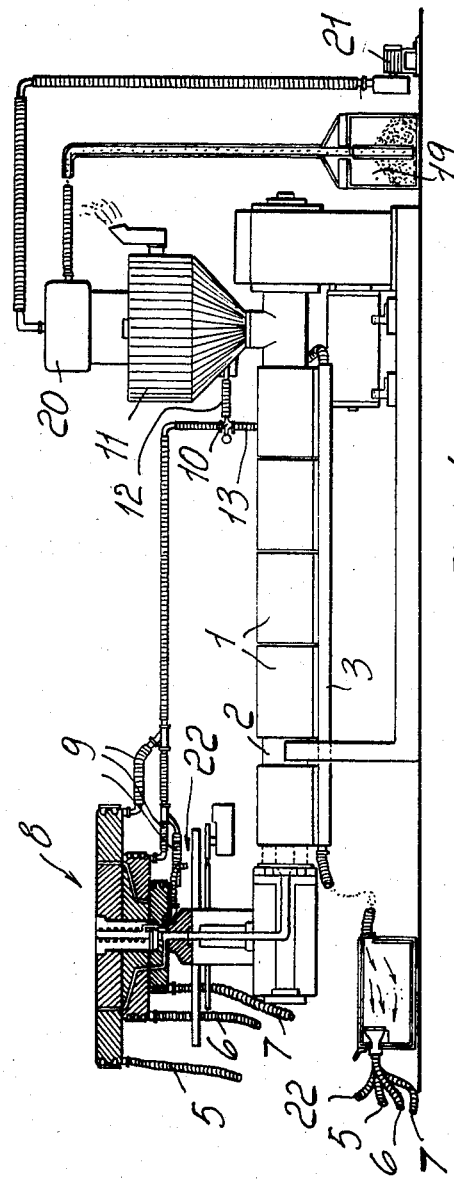
FIG. 1 shows schematically this system, with the blow-working head in section.
Figure 3:
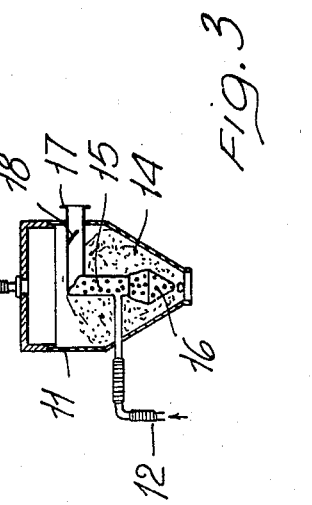
FIG. 3 is a detail view in section of a granule preheater, dehumidifier, drier.
Figure 2:
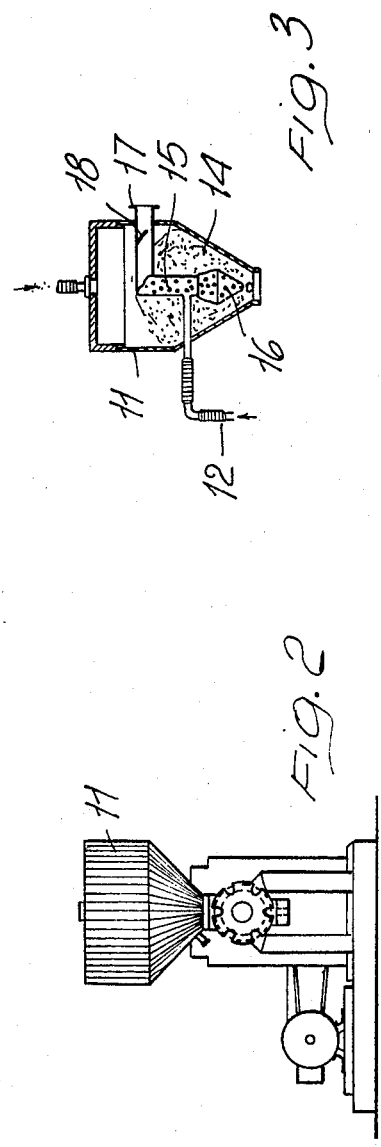
FIG. 2 is a front end view of the extruder.

Referring in particular to the refence numerals used in the various drawing views, this system for extruding, drawing, or otherwise hot processing plastomers or elastomers comprises, in the instance of a blow-extruder machine, a set of electric thermal heater units 1 mounted on the extruder cylinder 2.

Such electric thermal units, in particular, are of the ventilated type and constructed to admit hot air into a channel 3 adapted to deliver said air, with the optionally assistance of a blowing or drawing fan, into a collecting chamber 4 which would be suitably insulated.

Said hot air is then distributed, over lines 5, 6, and 7, which are heat insulated, into specially provided grooves extending peripherally to the various parts of the blow-working heat 8. This same air is then exhausted through lines 9 and a three-way valve 10 into the drier 11, as via a pipe duct 12, or is alternatively drawn up by a suction fan into said electric thermal units through a pipe duct 13.

In practice, the availability of low moisture content hot air allows substitution of the conventional hopper with the drier 11, thus providing adequate preheating of the plastic material granules 14.

That air will then, through the cylindrical chamber 15, having a bottom bulb 16 and being both perforated, sweep across and ventilate said granules, prior to their being dropped into the inlet mouth of the extruder cylinder 2, to then exhaust via the pipe duct 17 equipped with a gating valve or deflector 18.

The supply of granules from a storage container 19 is, in particular, controlled by a specially provided automatic feeder 20, while the operating temperature can be controlled, to suit the material being treated, by adjusting the speed of the fan 21.

By supplying hot air, through the pipe duct 13 to the electric thermal units 1, and viceversa, it becomes possible to alleviate the resistance heater work and at the same time promote a constant temperature of the extruder cylinder 2, thus preventing the latter from undergoing sudden thermal surges.

It is, however, to be noted that the hot air for delivery to the drier or cited electric thermal units may also be picked up directly from either the head 8 or channel 3.

As shown in FIG. 1, moreover, a thermally insulated duct line 22 is provided which leads to the center area of the head 8 for preheating it.

From the foregoing description and an observation of the accompanying drawing figures, the improved functionality and power savings afforded by the system for extruding, molding, drawing, or otherwise hot processing plastomers or elastomers, according to this invention, may be fully appreciated.

Of course, this system has been described and illustrated by way of example and not of limitation, and for the sole purpose of showing the practical value and general features of the invention, and the same may be altered and modified as may occur to a skilled person in the art without departing from the scope of the innovative concepts set forth hereinabove.

I claim:

1. In a system for extruding, molding, drawing and similarly hot processing plastomers or elastomers, utilizing for cylinder heating ventilated electric thermal units mounted on said cylinder, the improvement therein said system is a closed loop type of system comprising a plurality of pipes adapted to deliver hot air from said electric thermal units to areas of said system requiring heat application and to return at least a part of said air to said electric thermal units and wherein said electric thermal units are adapted and constructed to admit hot air into a channel communicating with an insulated hot air storage chamber therefrom a plurality of thermally insulated duct lines extend coupled to specially provided grooves arranged peripherally to the various parts of the blow-working head, or molds, or dies, or flat heads, said hot air being then exhausted through additional duct lines and a three way valve into a drier or dehumidifier acting as a granule feeder, a part of said air being returned to said thermal units to decrease the thermal work of the latter, thereby improving thermal efficiency, said cylinder temperature and pressure working conditions and the life of said thermal units.

* * * * *